United States Patent [19]
Frei et al.

[11] Patent Number: 4,627,862
[45] Date of Patent: Dec. 9, 1986

[54] AIR CLEANING APPARATUS
[75] Inventors: Roland Frei; Franz Gutmann, both of Rebstein, Switzerland
[73] Assignee: Plaston AG, Widnau, Switzerland
[21] Appl. No.: 696,778
[22] Filed: Jan. 31, 1985
[30] Foreign Application Priority Data
Feb. 7, 1984 [CH] Switzerland .......................... 565/84
[51] Int. Cl.⁴ .............................................. B01D 50/00
[52] U.S. Cl. ...................... 55/316; 55/467; 55/500
[58] Field of Search .................. 55/316, 387, 486, 487, 55/467, 471, 472, 473, 500

[56] References Cited
U.S. PATENT DOCUMENTS 3,093,649 6/1963 Woolston et al.
4,074,985 2/1978 Willas .................................. 55/498
4,250,172 2/1981 Mustzenberg et al. ............. 428/234
4,259,096 3/1981 Nakamura et al. .................. 55/486
4,339,250 7/1982 Thut ...................................... 55/316
4,361,427 11/1982 Barradas ............................... 55/316

FOREIGN PATENT DOCUMENTS
0082488 6/1983 European Pat. Off. ............. 55/316
3321059 10/1983 Fed. Rep. of Germany .
967429 3/1950 France .
1556854 12/1968 France .
2391428 12/1978 France .
1117900 6/1968 United Kingdom .

Primary Examiner—Bernard Nozick
Attorney, Agent, or Firm—Yount & Tarolli

[57] ABSTRACT

An air cleaning apparatus comprises a housing that includes four housing parts and a motor unit with an axial fan arranged in the middle zone of the apparatus. The motor unit forms with upper and lower housing parts a single unit. The air is sucked by the motor through a circular air channel. The outer zone of the air channel is surrounded by a multi-layer filter mat in the form of a shell. Along the side surface of the apparatus, air inlet openings are arranged. In the central zone on the upper surface of the cover air outlet openings are provided.

6 Claims, 3 Drawing Figures

AIR CLEANING APPARATUS

The present invention relates to an air cleaning apparatus that comprises a housing consisting of a plurality of housing parts, a motor unit with an air circulating fan, inlet and outlet opening for the air, electrical control means, and a filter formed of several components.

Air cleaning apparatus of this kind are known. They are used in offices, dwellings and other zones for cleaning the air. The known apparatus have on their base or on a side surface an air suction opening and on the cover surface or, again, on a side surface an air outlet opening. A motor with a fan is located inside of the apparatus. The fan carries the air from the suction to the outlet opening. An air filter is arranged between the suction opening and the fan. This filter usually consists of several components which are laid into a closed case. The components, normally, include a coarse filter, a fine filter and an odor-absorbing filter. These components are designed to remove smoke, unpleasant odors, dust, pollen and other foreign particles from the air. The amount of air cleaned by the known apparatus are relatively small and amount to about 10 to 30 cubic meters per hour. In many cases, the stream of air is not conducted entirely through the filter case, but partially through a bypass. Since the filter components are located in a case, at intervals of weeks or months, when it is necessary to change the filter, the whole case must be thrown away. This additional material forms a burden on the environment. Large units which avoid this disadvantage in part, are heavy and inflexible and, thus, can be used to only a limited extent in offices and dwellings.

The present invention eliminates the disadvantages of the known apparatus and provides a simple portable air cleaning apparatus with an increased capacity and which provices a thorough cleaning of the air of smoke, pollen, dust and other impurities, and in which the filter is not enclosed in a case.

This is achieved according to the invention, by providing a conventional axial fan such as manufactured by French company E.T.R.J., locating the motor and fan unit in the middle zone of the apparatus, forming upper and lower housing parts and the motor unit as a single detachable unit surrounded by a circular air channel, providing in the outer zone of the air channel a filter mat in the form of a shell enclosing the air channel, and arranging the air inlet openings along the side surface of the housing and the air outlet opening in the central zone on the top surface of the housing. According to the invention, the whole filter shell is used as a suction surface for the air. This significantly increases the suction surface and, at the same time, reduces the need for suction power. As a result, the motor-fan unit, arranged in the middle zone of the housing, needs only small drive power. This arrangement also increases the filter surface, that permits to obtain a higher dirt-absorbing capacity of the filter.

The arrangement of the motor-fan unit in the middle zone of the housing makes possible the utilization of a larger portion of the housing volume as free space for the flow of air. The housing may be round, rectangular, or have any other shape without greatly impairing the advantages of the invention.

The filter mat is formed, advantageously, of several layers, at least one layer containing active carbon (charcoal), and at least one another layer consisting of an electrostatically charged nonwoven material. The electrostatically charged nonwoven material is attached to a coarse filter, and the active carbon may be layered between the nonwoven material and coarse filter. This form of the filter makes it possible to omit a supporting frame or case, by which a considerable reduction of waste material is attained. Moreover, the same filter mat may also be used for units of different shape, so long as the circumference of the filter shell has about the same size. Mats of this kind may be cut to other formats, if necessary. This increases the economy and usefulness of air cleaning units and filter mats of this kind considerably. The upper and lower housing parts have radially-extending supports thereon. One of these supports has at its outer end a step-shaped bearing support surface, and this latter is partly covered with adhesive strips. The ends of the rectangular filter mat are fastened detachably to the adhesive strips on this support. This arrangement enables an easy changing of the filter mat. However, the air suction channel is completely enclosed by the filter mat. To increase profitability, the air channel is kept free of installations, so far as possible and, in particular, the electrical structural parts which, except the motor and its feed connections, are arranged between and on the lower housing and housing bottom part. For optimization of air flow conditions, a first flow-conducting surface is arranged on the upper housing part. Enclosing the motor-fan unit is a second flow-conducting surface arranged on the lower housing part. These two surfaces define the air channel and diverge toward the filter mat. These flow surfaces should be designed so that on the inner side of the filter mat, a uniform vacuum results, and in the passage of the air flow from the filter mat to the motor-fan unit, no sudden pressure leaps occur.

Thus, according to the invention, an air cleaning apparatus is provided which has an air cleaning capacity several times greater than that of the known up to now apparatus that is used in the home and office zone. An apparatus with current absorbtion of 18 watts per hour makes possible, for example, an air circulation through the unit of up to 125 cubic meters per hours. The capacity for cleaning air of dust, smoke and pollen is also distinctly higher, by 50% to 100%. Despite this, the apparatus is very compact and easily portable, which makes it useful in the home or office space, and it can also be used in hospitals, sickrooms, etc.

Other details, features and advantages of the invention will appear from the description that follows with reference to the respective drawings, wherein.

Figure 1:
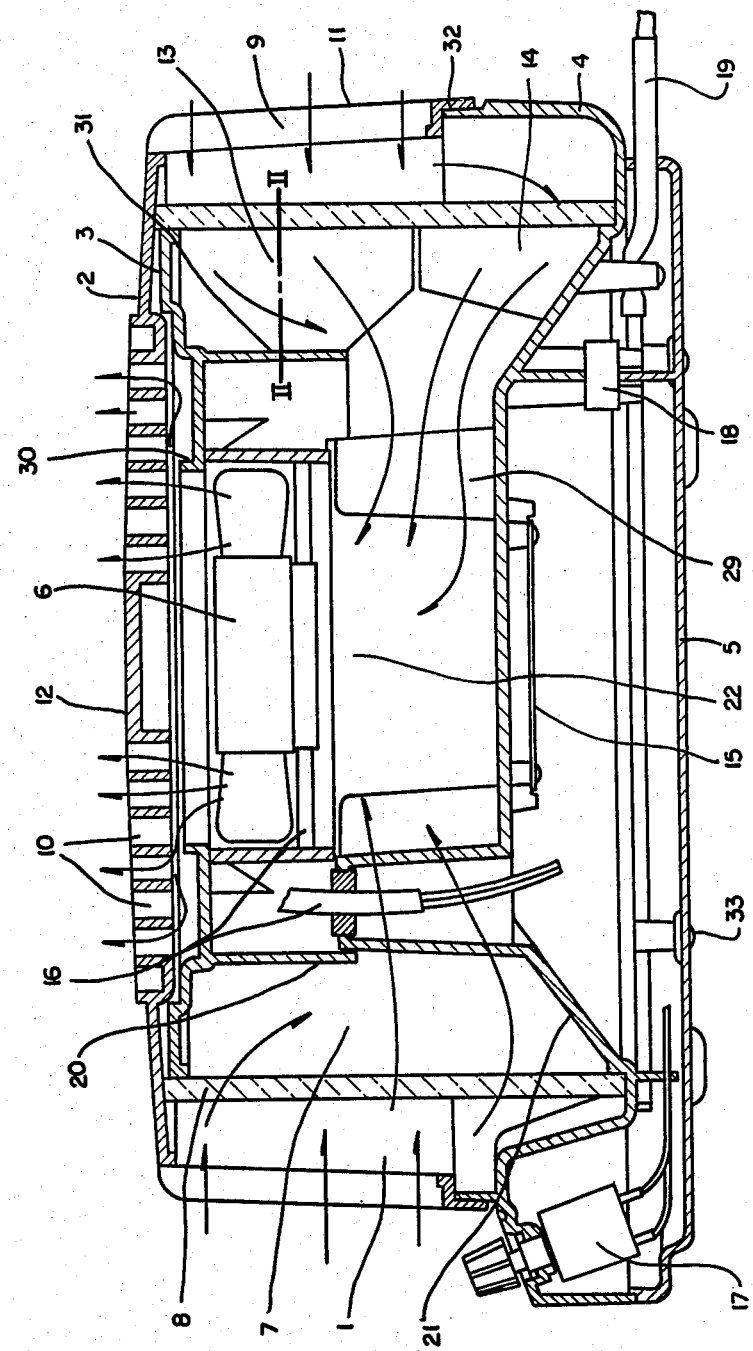
FIG. 1 is a longitudinal section of an air cleaning apparatus according to the invention.

The air cleaning apparatus according to FIG. 1 comprises a housing that includes a cover 2, an upper housing part 3, a lower housing part 4, and a bottom 5. In the middle zone 22 of the housing 1, a motor unit 6 is arranged. The motor unit 6 includes in one compact unit fan blades 6a and a fan housing 6b. The motor unit 6 is screwed by screws 30 to a support 29 attached to the lower housing part 4. The upper housing part 3 is, in turn, screwed detachably to the motor unit 6. A circular air channel 7 extends around the middle zone 22 of the apparatus. The air channel is closed with a filter mat 8 in the form of a cylindrical shell. This air channel 7 has limiting surfaces, namely, a first flow conducting surface 20 and a second flow conducting surface 21, which diverge toward the filter mat 8. The first flow conducting surface 20 is a part of the upper housing part 3. The second flow conducting surface 21 is a part of the lower housing part 4. A collar 31 is attached to the upper housing part 3. The collar 31 deflects the air in the middle zone 22 under the motor unit 6.

The cover 2 is attached loosely to the apparatus and is connected by a collar 32 with the lower housing part 4. The bottom 5 is fastened by screws 33 to the lower housing part 4. Between the bottom 5 and the lower housing part 4, are located the electrical structural elements, except the motor unit 6 and its feed wire 16. The electric energy to the apparatus is fed through a feed cable 19. Wire connections (not shown) extend from the connection terminals 18 to a conductor plate 15 on which known electronic control elements are mounted. Connected to the conductive plate 15 is an R.P.M. regulator 17 and the feed wires 16 of the motor unit 6. A control lamp (not shown) is also provided. By this arrangement, all the electric connections are protected, even with the cover 2 lifted off, and the control elements are not accessible without disassembly of the apparatus. This increases the safety of operation.

Air inlet openings 9 are provided around the whole circumference of the side surface 11 of the housing 1. These are formed by alternating vertically arranged rectangular slots and plates. On the upper surface 12 of the cover 2 are arranged air outlet openings 10 which have a circular cross section and are alternated with an equal number of plates. When the motor unit 6 and its fan operates, a vacuum is created in the air channel 7, and air is sucked through the air inlet openings 9 and the filter mat 8. This air is conducted through the first and second flow conducting surfaces 20, 21 into the middle zone 22 under the motor 6. The form of the flow conducting surfaces 20, 21 provides for an air pressure path as uniform as possible. The sucked and cleaned air is delivered by the fan through the air outlet openings 10. Because of the large difference of flow speeds at the air inlet and outlet openings, practically, there is no secondary flow from the outlet openings to the inlet openings. Since the upper housing part 3, the housing of the motor unit 6, and the lower housing part 4 completely limit the flow channel 7, the air can only flow through the filter mat 8 and through the fan blades. The apparatus has no bypass. Arranged on the upper and lower housing parts 3 and 4 and extending into the air channel 7 are radially vertical supports 13 and 14, which control and improve the air flow still further.

Figure 2:
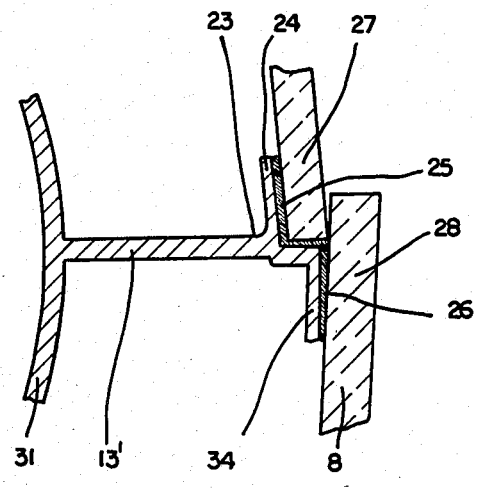
FIG. 2 is a partial horizontal section along lines II—II in FIG. 1 through a support with support surfaces for a filter mat.

FIG. 2 shows a horizontal section through a support 13' on the upper housing part 3. The support 13' has at the outer end 23 thereof a step-shaped bearing support 24, 34 of which the outwardly directed surfaces are covered with adhesive strips 25, 26 which are glued thereto.

The two support surfaces 24 and 34 are displaced from each other at a distance such that the step difference corresponds approximately to the thickness of the filter mat 8. The filter mat 8 is attached to the apparatus so that one end 27 of the rectangular filter mat 8 is pressed against the adhesive strip 25. The mat is laid around the air channel 7 along the supports 13, 14 in the form of a cylindrical shell. The other end 28 of the filter mat 8 is pressed against the adhesive strip 26. In this way, the filter mat 8 encloses the whole suction zone of the air channel 7, without additional supports being necessary. The end 28 of the filter mat 8 can overlap the other end 27 in a relatively wide zone without appreciably disturbing the function of the apparatus. The replacement of a soiled filter mat 8 is effected by lifting off the cover 2 from the housing, disengaging the end 28 from the adhesive strip 26 and unwinding the mat 8 from the unit. The end 27 of the mat 8 can also be easily disengaged from the adhesive strip 25, then a new fresh mat can be put in place.

Figure 3:
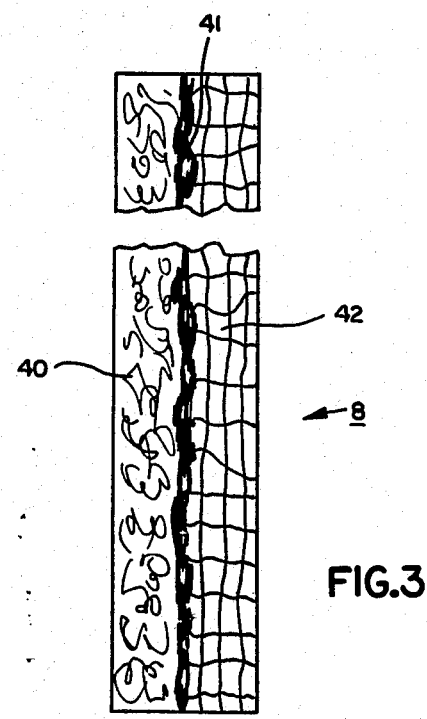
FIG. 3 is a section of the filter mat along lines 3—3 of FIG. 1.

As shown in FIG. 3, the filter mat 8 comprises a coarse filter layer 40, a layer of electrostatically charged nonwoven material 42, and a layer of active carbon 41. The three layers may be interlocked.

We claim:

1. An air cleaning apparatus comprising a housing consisting of a plurality of housing parts, a motor unit including an axial air circulating fan, inlet and outlet opening means for admitting air into said housing and for delivering clean air therefrom, electrical control means for controlling the operation of said motor unit, and filter means for cleaning the air admitted into said housing, said plurality of housing parts comprising upper and lower housing parts forming a chamber therebetween located in a middle zone of said housing and having radially extending supports for supporting said motor unit in said chamber, each of said upper and lower housing parts having surface means thereon facing each other and defining at least partially an air channel for conducting air from said inlet opening means to said motor unit, said inlet opening means being arranged on a side of said housing and said outlet opening means being arranged on the top of said housing, one of said radially extending supports having at the outer end thereof step-shaped bearing support surfaces covered with adhesive strips, said filter means comprising a strip of filter material, and the opposite ends of said strip being attached to said adhesive strips to form a filter shell surrounding said air channel.

2. An air cleaning apparatus comprising a housing having inlet opening means for admitting air into said housing and outlet opening means for delivering cleaned air therefrom, a motor unit including an axial air circulating fan, and filter means for cleaning the air admitted into said housing, said housing comprising first and second housing parts defining a chamber therebetween, said motor unit being located in said chamber, each of said first and second housing parts having surface means thereon facing each other and defining an air channel at least partially circumscribing said motor unit and extending about the axis of said axial air circulating fan for conducting air from said inlet opening means to said axial air circulating pump, said inlet opening means being arranged on the side of said housing located radially outwardly of said air channel, said outlet opening means being located on the axis of said axial air circulating fan and in an end surface of said housing extending transverse to the axis of said axial air circulating fan, said filter means being in the form of a shell located between said inlet opening means and said air channel in circumscribing relationship relative to said air channel, and said filter shell completely enclosing said air channel, said housing further comprising bottom means, and said apparatus further comprising electrical control means for controlling operation of said motor unit, said electrical control means being located between said bottom means and the adjacent one of said first and second housing parts.

3. An air cleaning apparatus comprising a housing having inlet opening means for admitting air into said housing and outlet opening means for delivering cleaned air therefrom, a motor unit including an axial air circulating fan having an inlet extending about the axis of said axial air circulating fan, and filter means for cleaning the air admitted into said housing, said housing comprising first and second housing parts defining a chamber therebetween, said motor unit being located in said chamber, each of said first and second housing parts having surface means thereon facing each other and defining an air channel at least partially circumscribing said motor unit and extending about the axis of said axial air circulating fan for conducting air from said inlet opening means to said inlet of said axial air circulating pump, said inlet opening means being arranged on the side of said housing located radially outwardly of said air channel, said outlet opening means being located on the axis of said axial air circulating fan and in an end surface of said housing extending transverse to the axis of said axial air circulating fan, said filter means being in the form of a shell located between said inlet opening means and said air channel in circumscribing relationship relative to said air channel, and said filter shell completely enclosing said air channel, said surface means on said first and second housing parts having air flow conducting surface portions converging toward said axial air circulating fan at least in the vicinity of said inlet.

4. An air cleaning apparatus as set forth in claim 3 wherein said first and second housing parts have radially extending supports, one of said radially extending supports having at the outer end thereof step-shaped bearing support surfaces covered with adhesive strips, said filter means comprising a strip of filter mateial opposite ends of which are attached to said adhesive strips to form said shell.

5. An apparatus as set forth in claim 3 wherein the filter shell is formed of a plurality of layers of which at least one layer contains active carbon and another layer consists of electrostatically charged nonwoven material.

6. An apparatus as set forth in claim 5 wherein the electrostatically charged nonwoven material is attached to a coarse filter and active carbon is placed between the nonwoven material and the coarse filter.

* * * * *